May 12, 1953  V. G. MAY  2,638,150
ADJUSTABLE SEAT STRUCTURE
Filed Feb. 7, 1951  3 Sheets-Sheet 1
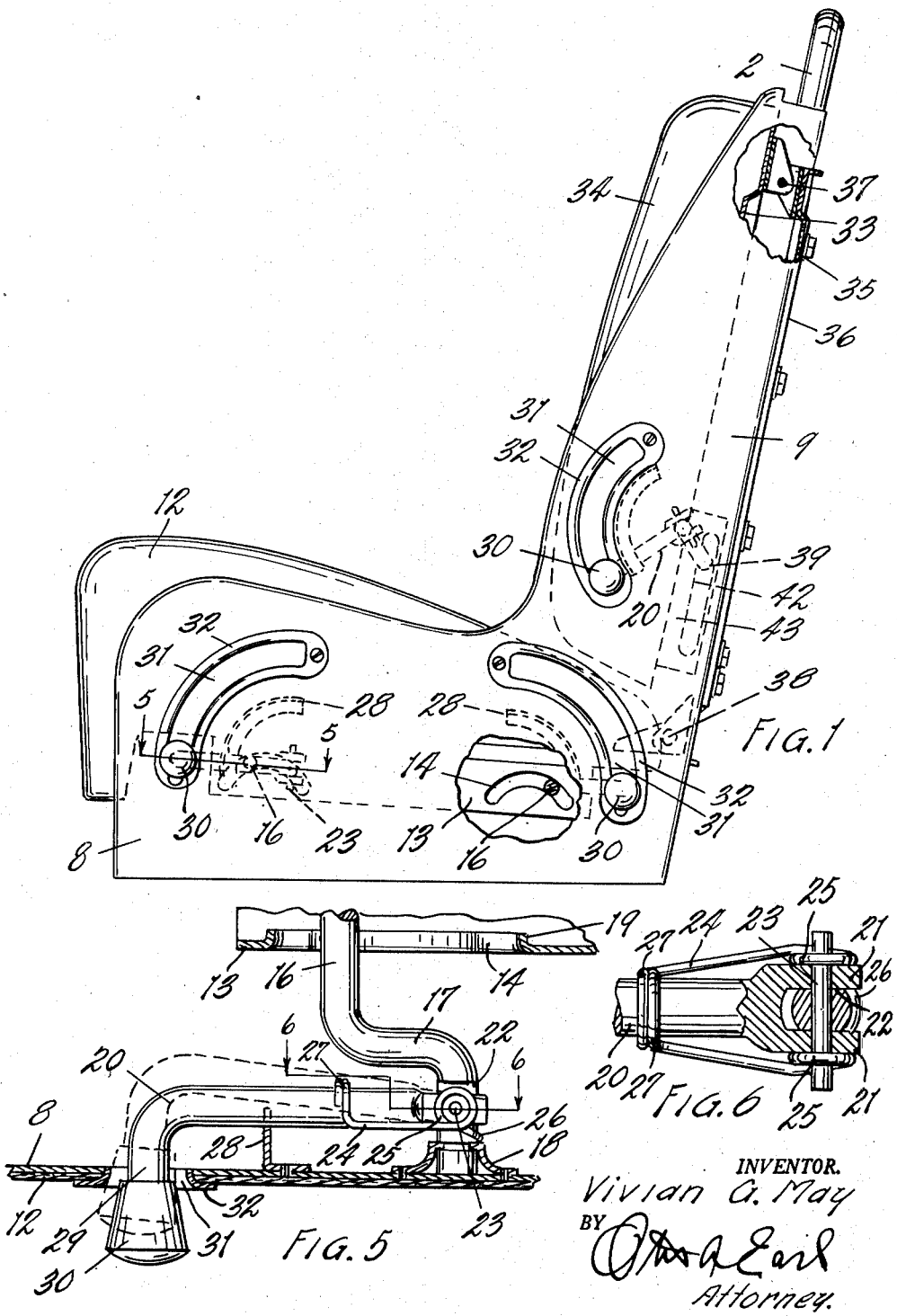
INVENTOR.
Vivian G. May
BY
Attorney.

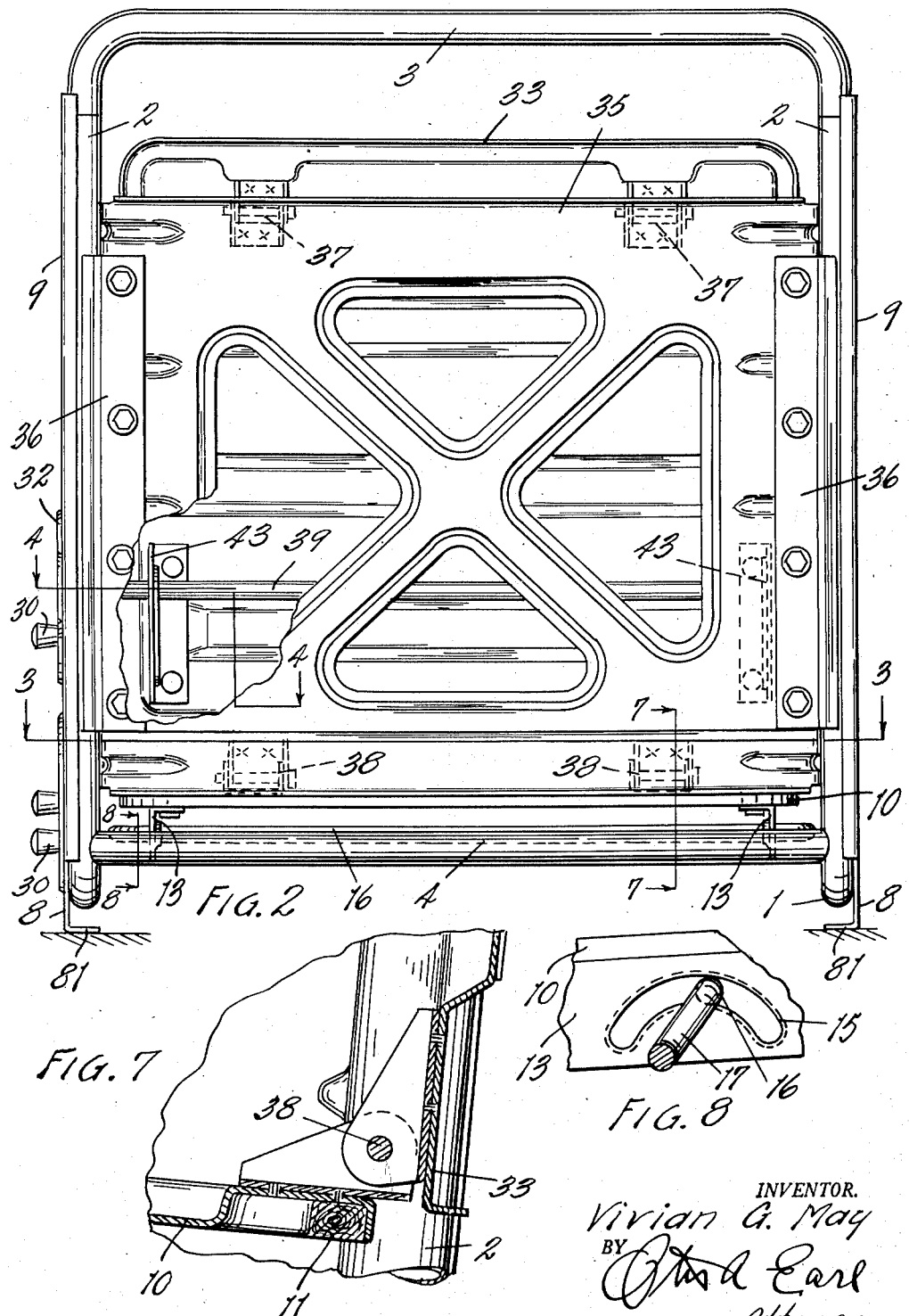

INVENTOR.
Vivian G. May
BY Otis A. Earl
Attorney.

Patented May 12, 1953

2,638,150

UNITED STATES PATENT OFFICE 2,638,150

ADJUSTABLE SEAT STRUCTURE

Vivian G. May, Kalamazoo, Mich., assignor to Checker Cab Manufacturing Corporation, Kalamazoo, Mich.

Application February 7, 1951, Serial No. 209,806

15 Claims. (Cl. 155—116)

This invention relates to improvements in adjustable seat structure.

The main objects of this invention are:

First, to provide an adjustable seat structure well adapted for use in motor vehicles such as taxis, trucks, buses and passenger cars in which both the seat and the back are capable of a considerable range of adjustment to meet the requirements of the particular user.

Second, to provide an adjustable seat structure having these advantages in which the adjustments can be very easily made.

Third, to provide an adjustable seat structure in which the seat element or unit may be adjusted vertically and tiltably.

Fourth, to provide an adjustable seat structure in which the back may be adjusted vertically and also tilted.

Fifth, to provide a structure having these advantages which is comparatively simple and economical in structure and at the same time very strong and rigid.

Objects relating to details and economies of the invention will appear from the description to follow. The invention is pointed out in the claims.

A preferred embodiment of the invention is illustrated in the accompanying drawings, in which:

Fig. 1 is a side elevational view of a seat structure embodying my invention, parts being broken and sectioned to illustrate structural details, the relation of other parts being indicated by dotted lines.

Fig. 2 is a rear elevational view of the structure without upholstery.

Fig. 5 is an enlarged fragmentary view partially in section on a line corresponding to line 5—5 of Fig. 1.

Fig. 6 is an enlarged fragmentary view in section on a broken line 6—6 of Fig. 5.

Fig. 7 is an enlarged fragmentary view on a line corresponding to line 7—7 of Fig. 2.

Fig. 8 is a fragmentary view partially in section illustrating further details of the means for adjustably supporting the seat sections corresponding to line 8—8 of Fig. 2.

I have illustrated my invention in an embodiment as especially designed for seats for drivers of taxis, trucks and the like although it should be understood that it is desirable for seat structures generally.

Figure 3:
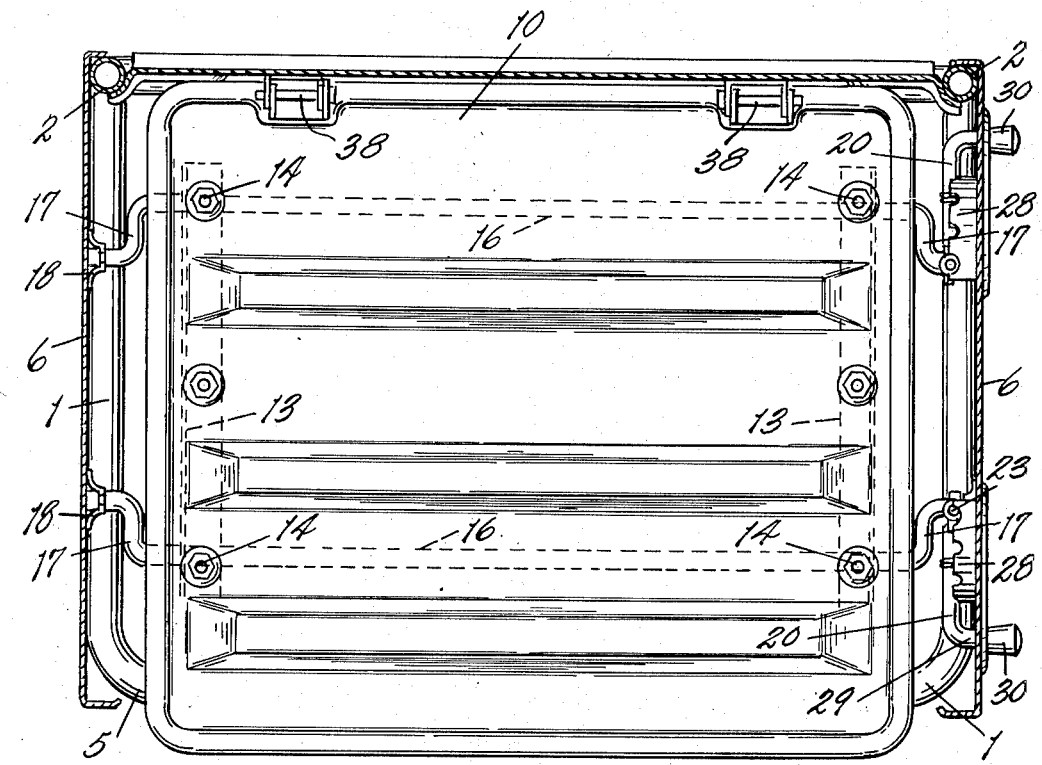
Fig. 3 is a horizontal section on a line corresponding to line 3—3 of Fig. 2 with the upholstery omitted.
Figure 4:
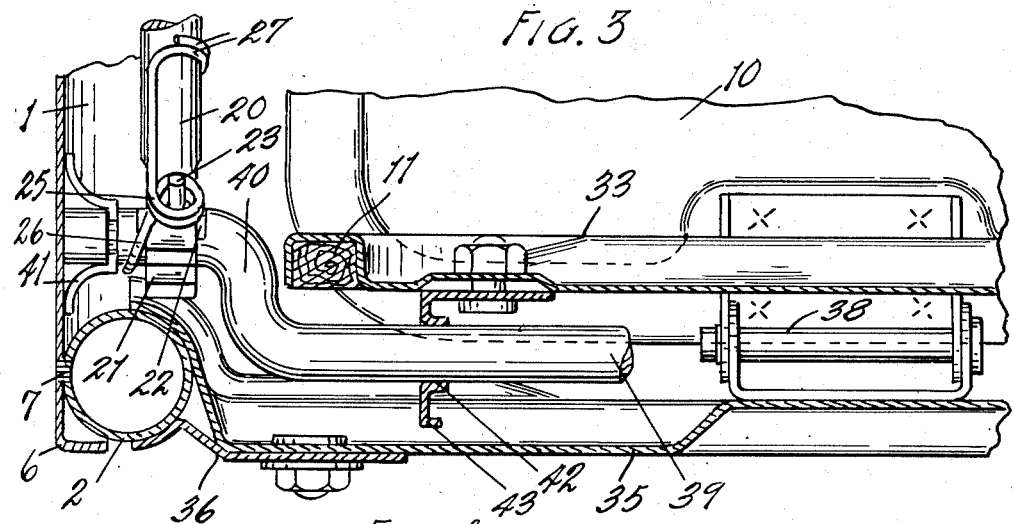
Fig. 4 is an enlarged fragmentary view on a line corresponding to line 4—4 of Fig. 2.

The embodiment illustrated comprises a frame including a base 1, back uprights 2 formed of tubing and the upper ends of the uprights connected by the cross member 3. The lower ends of the uprights and rear ends of the base members are connected by the cross member 4. The front ends of the side base members are connected by the cross member 5. The frame side members 6, formed as sheet metal stampings, are secured to the outer sides of the base side members and uprights as by welding as indicated at 7 in Fig. 4. The side members include base portions 8 and upright portions 9.

The whole seat structure may, if desired, be mounted on slides to be adjusted backwards and forward. These are not illustrated as they form no part of my present invention. The structure illustrated is shown as resting upon supports 81 conventionally shown in Fig. 2. The seat member 10 is desirably in the form of a sheet metal stamping and provided with downwardly facing tacking strips 11 to which the cushion upholstery conventionally shown at 12 may be attached. Details of the spring and upholstery units are not illustrated as they form no part of my present invention.

The seat member 10 is provided with supporting rails 13 which extend from front to rear thereof and are secured to its under side by bolts 14. These supporting members 13 are provided with slots 15 preferably arcuate and curving upwardly. The seat member is supported by rods 16 disposed through the slots 14 having cranks 17 at their ends journalled in bearing members 18 mounted on the inner sides of the side members 8 (see Figs. 1 and 5). These supporting rods are disposed through the slots 15 which have inturned flanges 19 on their edges providing an effective sliding bearing engagement for the rods with the rails. The cranks 17 are provided with adjusting levers 20 which are forked at 21 to embrace the flattened portions 22 of the crank journals. The adjusting levers are pivotally connected to the cranks by means of the pins 23 disposed transversely of the cranks and the levers. The springs 24 have coils 25 therein embracing the pins 23, the bight portions 26 of the springs engaging the journalled portion of the crank as is shown in Figs. 5 and 6. The arms 27 of the springs terminate in hooks which are engaged with the levers to bias them into engagement with the rack-like keepers 28.

The levers have laterally turned ends 29 provided with finger pieces 30, the laterally turned ends being disposed through slots 31 in the side members which are provided with finishing plates 32. With this arrangement the seat may be adjusted vertically both front and rear ends thereof or it may be tilted from front to rear to meet the requirements of the particular user.

The back member 33 is desirably of sheet metal stamping and is adapted to receive the back cushion 34. The back member is supported for vertical adjustment and is mounted on the support member 35 provided with slides 36 which slidably engage the uprights 2, details of these slides being best shown in Figs. 2 and 4. The back member is hingedly connected at 37 to the slidable support 35 adjacent its upper end. The rear end of the seat member is hingedly connected to the back supporting member 35 at 38 (see Fig. 7) so that when the rear end of the seat is adjusted, the back is adjusted with it maintaining the general relationship of the back and the seat.

The back member is tiltably supported on its hinges 37 by means of the supporting rod 39 which, as is the case with the seat member supporting rods 16, is provided with cranks 40 at its ends journalled in bearings 41 corresponding to the bearings 18, the bearings 41 being secured to the uprights 9 of the side frames 6. The rod 39 engages slots 42 in the supports 43 on the rear side of the back member 33 and the cranks are provided with adjusting levers 20 of the same structure as described and provided with hand pieces 30 projecting through slots 31 provided therefor in the frame side members. Keepers 28 are provided for holding the back adjusting lever in its adjusted position.

With the parts thus arranged, the structure is capable of a wide range of adjustments. The seat may be raised and lowered to a substantial degree to meet the requirements of the user and the seat and back may be tiltably adjusted. This is particularly desirable for taxi and truck driver seats, buses and the like where a change of position may rest the user.

I have illustrated and described my invention in a highly practical embodiment thereof. I have not attempted to illustrate or describe other embodiments and adaptations which I contemplate as it is believed that this disclosure will enable those skilled in the art to embody or adapt my invention as may be desired.

Having thus described my invention, what I claim as new and desire to secure by Letters Patent is:

1. In an adjustable seat structure, the combination of a frame comprising a base, and back uprights, side members including base and back portions secured to said frame, a seat member provided with supporting rails having spaced upwardly curved arcuate slots therein, supporting and adjusting rods for said seat member disposed through said slots in said rails and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, an adjusting rod for said back member extending through said slotted supports and provided with crank arms at its ends journalled on said back portions of said side frames, adjusting levers for said rods secured to the cranks at one end thereof and having laterally turned hand pieces, said side members having arcuate slots therein through which said hand pieces extend, and rack-like keepers carried by said side members and coacting with said levers to hold the rods in their adjusted positions, said levers being pivotally connected to the cranks and spring biased to releasably engage said keepers.

2. In an adjustable seat structure, the combination of a frame comprising a base, and back uprights, side members including base and back portions secured to said frame, a seat member provided with supporting rails having spaced slots therein, supporting and adjusting rods for said seat member disposed through said slots in said rails and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, an adjusting rod for said back member extending through said slotted supports and provided with crank arms at its ends journalled on said back portions of said side frames, adjusting levers for said rods secured to the cranks at one end thereof, and rack-like keepers carried by said side members and coacting with said levers to hold the rods in their adjusted positions, said levers being pivotally connected to the cranks and spring biased to releasably engage said keepers.

3. In an adjustable seat structure, the combination of a frame comprising a base, and back uprights, side members including base and back portions secured to said frame, a seat member provided with supporting rails having spaced upwardly curved arcuate slots therein, supporting and adjusting rods for said seat member disposed through said slots in said rails and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, an adjusting rod for said back member extending through said slotted supports and provided with crank arms at its ends journalled on said back portions of said side frames, adjusting levers for said rods secured to the cranks at one end thereof and having laterally turned hand pieces, said side members having arcuate slots therein through which said hand pieces extend, and keepers carried by said side members and coacting with said levers to hold the rods in their adjusted positions.

4. In an adjustable seat structure, the combination of a frame comprising a base, and back uprights, side members including base and back portions secured to said frame, a seat member provided with supporting rails having spaced slots therein, supporting and adjusting rods for said seat member disposed through said slots in said rails and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, and adjusting rod for said back member extending through said slotted supports and provided with crank arms at its ends journalled on said back portions of said side frames, adjusting levers for said rods secured to the cranks at one end thereof, and keepers carried by said side members and coacting with said levers to hold the rods in their adjusted positions.

5. In an adjustable seat structure, the combination of a frame comprising a base, back uprights, and side members, a seat member provided with supporting members having spaced slots therein, supporting and adjusting rods for said seat member disposed through said slots in said supporting members and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, an adjusting rod for said back member extending through said slotted supports and provided with crank arms at its ends journalled on said frame side members, spring biased adjusting levers for said rods swingably connected to the cranks and having laterally turned hand pieces, said side members having slots therein through which said hand pieces extend for grasping, and keepers for said levers carried by said frame for holding the rods in their adjusted positions.

6. In an adjustable seat structure, the combination of a frame comprising a base, back uprights, and side members, a seat member provided with supporting members having spaced slots therein, supporting and adjusting rods for said seat member disposed through said slots in said supporting members and having crank arms at their ends journalled on said frame side members, a back supporting member slidably mounted on said uprights, said seat member being hingedly connected at its rear end to said back supporting member, a back member hingedly connected at its upper end to said back supporting member, said back member being provided with slotted supports adjacent its lower end, an adjusting rod for said back member extending through said slotted supports and provided with crank arms at its ends journalled on said frame side members, adjusting levers for said rods connected to the cranks, and keepers for said levers carried by said frame for holding the rods in their adjusted positions.

7. In an adjustable seat structure, the combination of a frame, a seat member provided with supporting members having spaced slots therein, supporting and adjusting rods for said seat member disposed through said slots in said rails and having crank arms at their ends journalled on said frame, a back supporting member slidably mounted on said frame, said seat member being hingedly connected at its rear end to said back supporting member, a back member swingably connected at its upper end to said back supporting member, said back member being provided with slotted supports adjacent its lower end, an adjusting rod for said back member provided with crank arms at its ends journalled on said frame, spring biased adjusting levers for said rods swingably connected to the cranks and having laterally turned hand pieces, and keepers for said levers carried by said frame for holding the rods in their adjusted positions.

8. In an adjustable seat structure, the combination of a frame, a seat member provided with supporting members having spaced slots therein, supporting and adjusting rods for said seat member disposed through said slots in said rails and having crank arms at their ends journalled on said frame, a back supporting member slidably mounted on said frame, said seat member being hingedly connected at its rear end to said back supporting member, a back member swingably connected at its upper end to said back supporting member, said back member being provided with slotted supports adjacent its lower end, an adjusting rod for said back member provided with crank arms at its ends journalled on said frame, adjusting levers for said rods connected to the cranks, and keepers for said levers carried by said frame for holding the rods in their adjusted positions.

9. In an adjustable seat structure, the combination of a frame, a seat member, independently adjustable supports for said seat member whereby it may be vertically adjusted or the front and rear ends tiltably adjusted relative to each other, a vertically adjustable back supporting member carried by said frame, said seat member being hingedly connected at its rear end to said back supporting member, a back member hingedly connected to said back supporting member, and means for swingably adjusting the back member on its hinge connection carried by said back supporting member.

10. In an adjustable seat structure, the combination of a frame, a seat member, independently adjustable supports for said seat member whereby it may be vertically adjusted or the front and rear ends tiltably adjusted relative to the other end, a vertically adjustable back support carried by said frame, said seat member being hingedly connected at its rear end to said back support, a back member swingably connected to said back support, and means for swingably adjusting the back member.

11. In an adjustable seat structure, the combination of a frame including side members, a seat member provided with supports having spaced upwardly curved arcuate slots therein, supporting and adjusting rods for said seat member disposed through said slots and having crank arms at their ends journalled on said frame side members, and adjusting levers for said rods secured to the cranks at one end thereof and having laterally turned hand pieces, said side members having slots therein through which said hand pieces extend, and rack-like keepers carried by said side members and coacting with said levers to hold the rods in their adjusted positions, said levers being pivotally connected to the cranks and spring biased to releasably engage said keepers.

12. In an adjustable seat structure, the combination of a frame including side members, a seat member provided with supports having spaced slots therein, supporting and adjusting rods for said seat member disposed through said slots and having crank arms at their end journalled on said frame side members, and adjusting levers for said rods secured to the cranks at one end thereof, and keepers carried by said side members and coacting with said levers to hold the rods in their adjusted positions.

13. In an adjustable seat structure, the combination of a frame a seat member mounted on said frame for vertical and tilting adjustment, a back support mounted on said frame for vertical sliding adjustment and connected to the rear end of said seat member for vertical adjustment therewith, a back member hingedly connected at its upper end to said back support, said back member being provided with slots adjacent its lower end, an adjusting rod for said back member provided with crank arms at its ends journalled on said frame, a spring biased adjusting lever for said rod swingably connected to one of said crank arms at one end thereof and having a laterally turned hand piece, the adjacent side member having a slot therein through which said hand piece extends for grasping, and a keeper for said lever carried by said frame for holding the rod in its adjusted position.

14. In an adjustable seat structure, the combination of a frame, a seat member mounted on said frame for vertical and tilting adjustment, a back support mounted on said frame for vertical sliding adjustment and connected to the rear end of said seat member for vertical adjustment therewith, a back member hingedly connected at its upper end to said back support, said back member being provided with slots adjacent its lower end, an adjusting rod for said back member provided with crank arms at its ends journalled on said frame, an adjusting lever for said rod, and a keeper for said lever carried by said frame for holding the rod in its adjusted position.

15. In an adjustable seat structure, the combination of a frame, a seat member mounted on said frame for tilting adjustment, a back support mounted on said frame for vertical sliding adjustment and to which the rear end of said seat is swingably connected, a back member hingedly connected adjacent its upper end to said back support, and means for adjustably supporting the lower end of said back member.

VIVIAN G. MAY.

References Cited in the file of this patent

UNITED STATES PATENTS

| Number | Name | Date |
|---|---|---|
| 1,409,212 | Behr | Mar. 14, 1922 |
| 1,855,245 | Kuenzel | Apr. 26, 1932 |

FOREIGN PATENTS

| Number | Country | Date |
|---|---|---|
| 852,467 | France | Oct. 30, 1939 |